US007029740B2

(12) United States Patent
Martin

(10) Patent No.: US 7,029,740 B2
(45) Date of Patent: Apr. 18, 2006

(54) LAYERED MAGNETIC WAFER SEAL

(75) Inventor: John J. Martin, Louisville, KY (US)

(73) Assignee: Crane Productions, Inc., Louisville, KY (US)

( * ) Notice: Subject to any disclaimer, the term of this patent is extended or adjusted under 35 U.S.C. 154(b) by 201 days.

(21) Appl. No.: 10/787,053

(22) Filed: Feb. 25, 2004

(65) Prior Publication Data

US 2004/0166278 A1 Aug. 26, 2004

Related U.S. Application Data

(60) Provisional application No. 60/450,154, filed on Feb. 26, 2003.

(51) Int. Cl.
*B32B 3/10* (2006.01)

(52) U.S. Cl. ......................... 428/43; 428/354; 428/900

(58) Field of Classification Search .................. 428/43, 428/354, 900; 229/78.1, 79, 80.5; 281/18
See application file for complete search history.

(56) References Cited

U.S. PATENT DOCUMENTS

| | | | |
|---|---|---|---|
| 1,938,654 | A | 12/1933 | Braren |
| 2,056,451 | A | 10/1936 | Haberstump |
| 2,388,770 | A | 11/1945 | Stein |
| 2,854,164 | A | 9/1958 | Triolo |
| 4,004,962 | A | 1/1977 | Kleid |
| 4,160,687 | A | 7/1979 | Spear |
| 5,054,757 | A | 10/1991 | Martin et al. |
| 5,185,983 | A | 2/1993 | Slater |
| 5,547,175 | A | 8/1996 | Graushar et al. |
| 5,891,300 | A | 4/1999 | Oussani, Jr. et al. |

*Primary Examiner*—Alexander S. Thomas
(74) *Attorney, Agent, or Firm*—James C. Eaves, Jr.; Greenebaum Doll & McDonald PLLC

(57) ABSTRACT

The present invention relates to a layered magnetic wafer seal for adhesive attachment to folded pieces, such as brochures, folded cards, self-mailers and postal mailers, which are generally made of card stock. One or more layered magnetic wafer seals may be adhesively attached to the open edges of a folded piece to secure the open edges together, for example, as required during the mailing process. The layered magnetic wafer seal can then be broken, preferably along at least one line of weakness, allowing the piece to be unfolded and converting the layered magnetic wafer seal into at least two magnetic holders for securing a piece to a metal surface. The unfolded piece can then be secured to a metallic surface by placing the side of the piece with the magnetic holders against the metallic surface, thereby allowing the magnetic holders to engage the metal surface, holding the piece in place.

20 Claims, 16 Drawing Sheets

LAYERED MAGNETIC WAFER SEAL

BACKGROUND OF THE INVENTION

This application claims the benefit of U.S. Provisional Application No. 60/450,154, filed Feb. 26, 2003.

(a) Field of the Invention

The present invention relates to a layered magnetic wafer seal for adhesive attachment to folded pieces, such as brochures, folded cards, self-mailers and postal mailers, which are generally made of card stock. One or more layered magnetic wafer seals may be adhesively attached to the open edges of a folded piece to secure the open edges together, for example, as required during the mailing process. The layered magnetic wafer seal can then be broken, preferably along at least one line of weakness, allowing the piece to be unfolded and converting the layered magnetic wafer seal into at least two magnetic holders for securing a piece to a metal surface. The unfolded piece can then be secured to a metallic surface by placing the side of the piece with the magnetic holders against the metallic surface, thereby allowing the magnetic holders to engage the metal surface, holding the piece in place.

(b) Description of the Prior Art

U.S. Pat. No. 1,938,654 to C. T. Braren teaches a machine for closing and sealing cartons, particularly cigarette cartons.

U.S. Pat. No. 2,056,451 to A. H. Haberstump teaches an apparatus for automatically stretching and securing a layer of fabric trim material over a padded backing sheet.

U.S. Pat. No. 2,388,770 to E. L. Stein teaches a method for sealing of mailing pieces by means of a small piece of gummed tape applied across the joint to be closed and sealed.

U.S. Pat. No. 2,854,164 to L. Triolo teaches a high speed machine for applying short lengths or tabs of tape having a coating of pressure sensitive adhesive thereon to box blanks or other articles.

U.S. Pat. No. 4,004,962 to Kleid teaches an automatic machine which utilizes sealing tape to seal the edges of a folded article passing therethrough.

U.S. Pat. No. 4,160,687 to Spear teaches an apparatus for applying labels across the pages of a magazine as it is being conveyed with the binding of the magazine first.

U.S. Pat. No. 5,054,757 to Martin et al. teaches an apparatus for producing mail pieces and a system and method for controlling the apparatus to produce mail pieces in a variety of configurations.

U.S. Pat. No. 5,185,983 to Slater teaches a machine comprising a pair of rolls on powered shafts for forming a tight fit between a wafer seal and a form piece as they move between the rolls.

U.S. Pat. No. 5,547,175 to Graushar et al. teaches a system for preparing mail products having an arrangement for folding each of the mail products at least once and externally applying a self-adhesive label around each of the mail products after folding.

U.S. Pat. No. 5,891,300 to Oussani, Jr. et al. teaches a tabbing machine for applying adhesive tabs over the edge of an article.

Businesses often advertise by sending coupons, promotional materials, flyers, and other types of advertising materials through the U.S. mail or by inserting them between the pages of newspapers. These folded and sealed pieces are either mailed in envelopes, which may contain other types of advertising material, or are mailed or delivered as folded and sealed pieces which do not employ an envelope. The U.S. Postal Service has enacted rules specifying how the open edges of unenveloped pieces must be secured (tabbed) to prevent an open edge from jamming high-speed mail processing and sorting equipment. These rules are enumerated in the Domestic Mail Manual Quick Service Guide 811, "Tabs and Wafer Seals," incorporated herein by reference. Construction of the piece plays an important role in determining automation compatibility. Standards for tabbing are based on basis weight of paper stock used and the location of the folded or bound edge. The sealing method used to secure the folded edges of the piece can employ glue, tape, or wafer seals. To open the piece, the consumer merely breaks the seal on the edges of the piece and unfolds the piece.

Applicant is aware of no prior art where a layered magnetic wafer seal can be used to seal a piece and then be converted into at least two magnetic holders for securing a piece to a metal surface by breaking the layered magnetic wafer seal, preferably along at least one line of weakness arranged across the wafer seal.

SUMMARY OF THE INVENTION

The present invention relates to a layered magnetic wafer seal for adhesive attachment to folded pieces, such as brochures, folded cards, self-mailers and postal mailers. In the preferred embodiment, the layered magnetic wafer seal is composed of a thin, relatively flat, flexible magnet having an upper surface, a lower surface, a thickness between said upper surface and said lower surface, two lines of weakness comprised of spaced perforations which extend across the upper surface and at least partially through the magnet thickness towards the lower surface, a first adhesive layer affixed to the lower surface, a paper layer having the same shape as the magnet affixed to the first adhesive layer, and a second adhesive layer affixed to the paper layer. The two lines of weakness, which intersect at their respective midpoints and form four approximately 90 degree angles between them, are comprised of a multiplicity of spaced perforations which extend through the magnet and paper layer. The layered magnetic wafer seal may be attached to and seal the edges of a folded piece by adhering the second adhesive layer to the edges of the piece. The layered magnetic wafer seal can then be converted into at least two magnetic holders for securing the piece to a metal surface by breaking, tearing, or otherwise severing the layered magnetic wafer seal to form the magnetic holders.

It is often the hope of the business producing or sending the piece that the consumer will retain the piece and post it in a conspicuous place, such as a bulletin board or refrigerator. Small, flexible magnets have become very popular with consumers, who use them as "refrigerator magnets" to hold coupons, advertisements, promotional material, postcards, etc. on their home refrigerator. Consequently, there is a need for flexible wafer seals which can be adhesively attached to folded card stock or other material used for advertising pieces to secure the open edges and which can subsequently be used to magnetically attach the unfolded piece to a metal object, such as a refrigerator, when the seal is broken.

A principal object and advantage of the present invention is that the layered magnetic wafer seal can be used to secure the edges of a piece and then be converted into at least two magnetic holders for securing a piece to a metal surface by breaking, tearing, or otherwise severing the wafer seal to form the magnetic holders.

An additional object and advantage of the present invention is that the layered magnetic wafer seal is easily manufactured in volume, is flexible enough to be folded over and be easily adhered in that position, is thin enough not to adversely impact a U.S. Postal Service automatic mail sorting machine, and is easily applicable to the edges of the piece.

An additional object and advantage of the present invention is that the layered magnetic wafer seal has sufficient strength to survive mailing but is easily broken or torn when upward or sideways pressure is applied to it so that the consumer may unseal the sealed edges of the piece without tearing the piece when such pressure is applied.

An additional object and advantage of the present invention is that when the layered magnetic wafer seal is detached from the liner and folded along a line of weakness, the line of weakness enhances the ability of the layered magnetic wafer seal to stay folded and not resume a flat position.

An additional object and advantage of the present invention is that the layered magnetic wafer seal of the preferred embodiment, and many of the alternate embodiments, may be utilized with existing tabbing machines by reconfiguring the tabbing machine to accept and apply the label.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
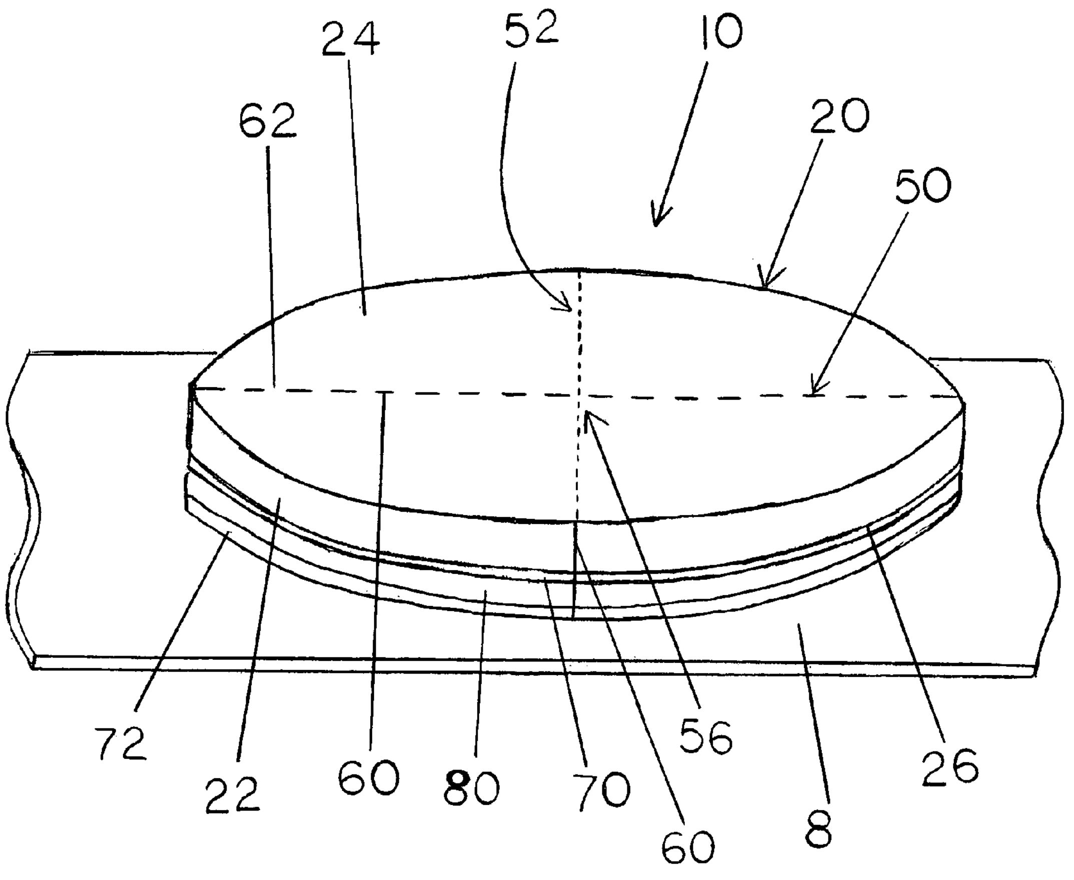
FIG. 1 is a top perspective view of the layered magnetic wafer seal of the present invention on a liner, depicting a magnet, a first adhesive layer, a paper layer, and a second adhesive layer, with two intersection lines of weakness comprised of spaced perforations through all layers.
Figure 2:
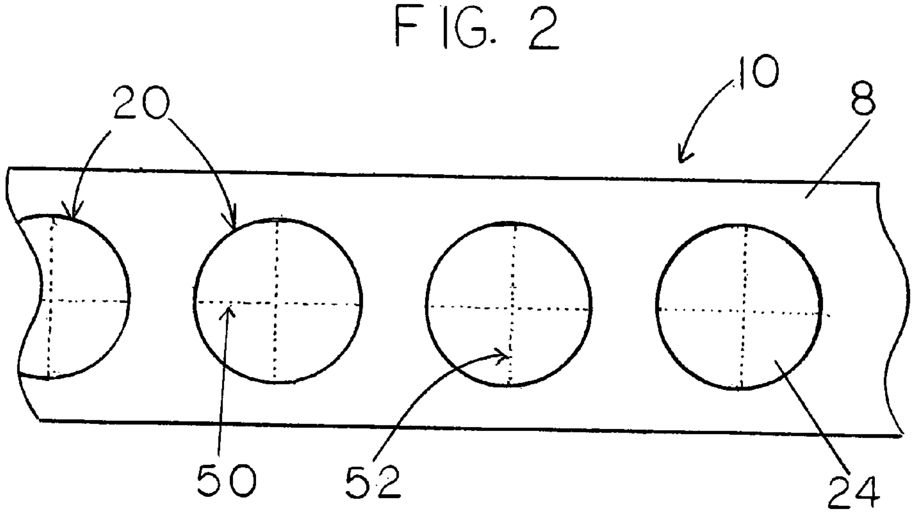
FIG. 2 is a top view of a multiplicity of the layered magnetic wafer seals of FIG. 1.
Figure 3:
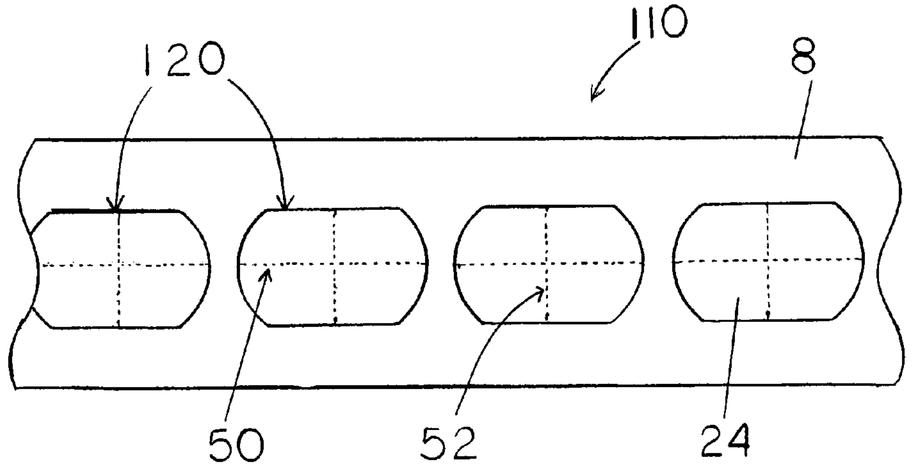
FIG. 3 is a top view of a multiplicity of an alternate embodiment of the layered magnetic wafer seal of FIG. 1, having a different shape.
Figure 4:
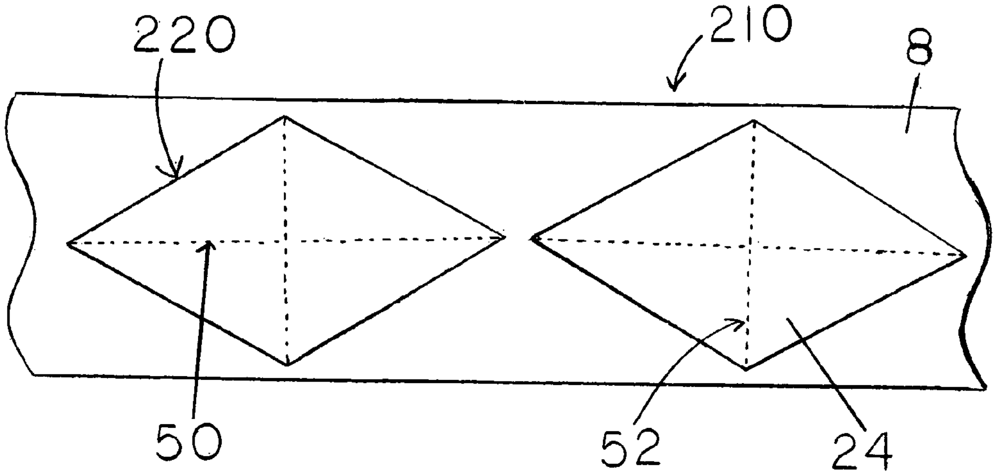
FIG. 4 is a top view of a multiplicity of an alternate embodiment of the layered magnetic wafer seal of FIG. 1, having a different shape.
Figure 5:
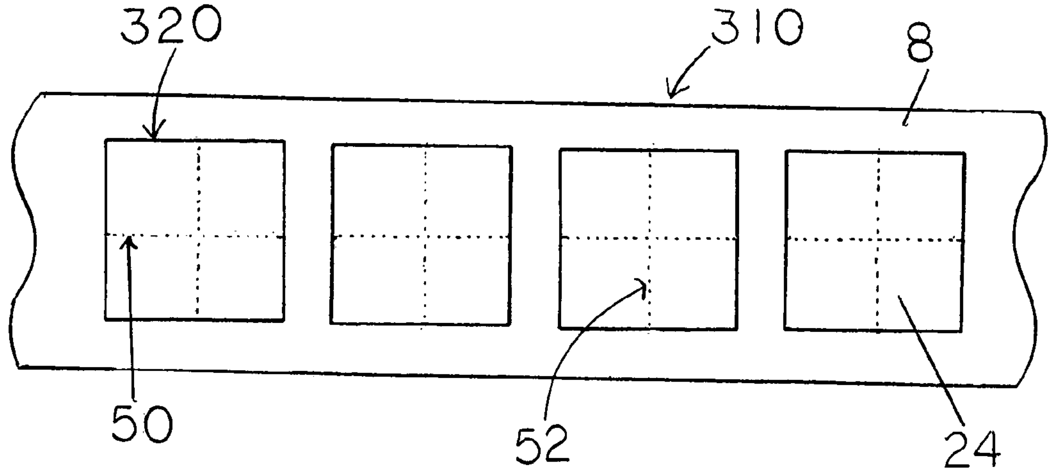
FIG. 5 is a top view of a multiplicity of an alternate embodiment of the layered magnetic wafer seal of FIG. 1, having a different shape.
Figure 24:
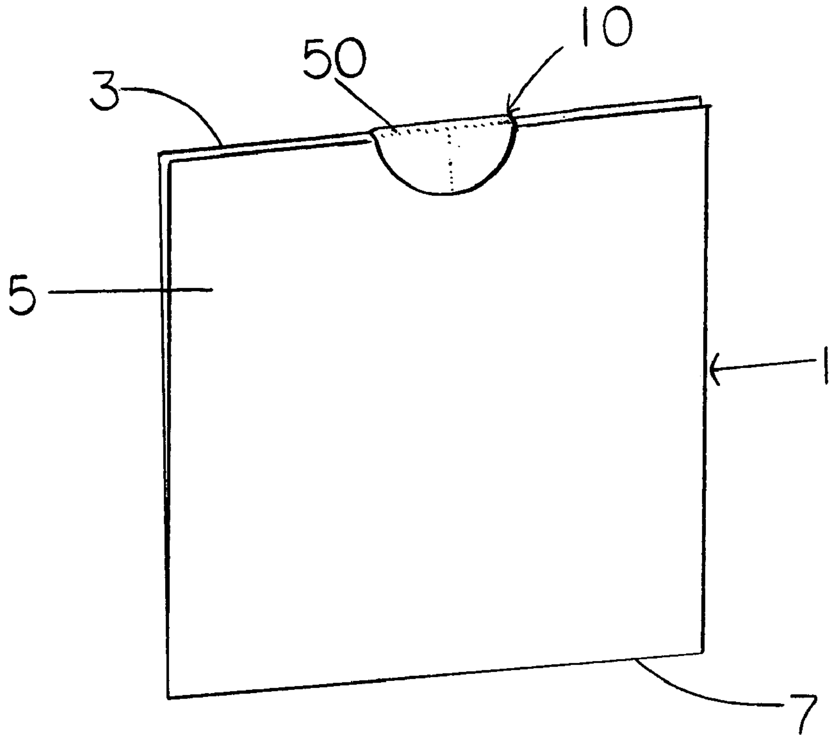
FIG. 24 is a front perspective view of a piece after sealing, folded into two sections and having the layered magnetic wafer seal of FIG. 1 affixed to two outside end edges.
Figure 25:
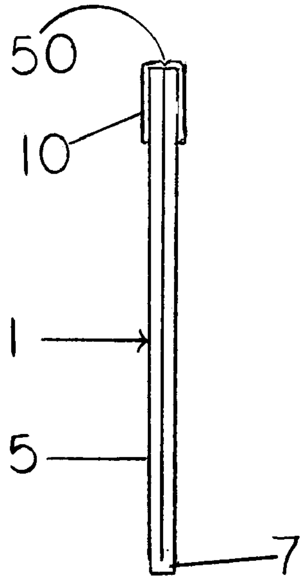
FIG. 25 is an end view of the piece of FIG. 24.

With reference to the figures, FIG. 1 shows a layered magnetic wafer seal 10 which is the preferred embodiment of the present invention removably adhesively affixed to liner 8. The layered magnetic wafer seal 10 is composed of a thin, relatively flat, flexible magnet 20 having an upper surface 24, a lower surface 26, a thickness 22 between said upper surface 24 and said lower surface 26, a first adhesive layer 70 affixed to the lower surface 26, a paper layer 80 having the same shape as the magnet 20 affixed to the first adhesive layer 70, and a second adhesive layer 72 affixed to the paper layer 80. At least one line of weakness, comprising two intersecting lines of weakness 50, 52 extend both across the magnet upper surface 24 and the paper layer 80 and extend completely through the magnet thickness 22 and paper layer 80. The two intersecting lines of weakness 50, 52 intersect at their respective mid-points 56 and form four approximately 90 degree angles between them. Each of the two lines of weakness 50, 52 are comprised of a multiplicity of spaced perforations 60 which extend through the magnet thickness 22 and the paper layer 80, and each of the multiplicity of perforations 60 have a spacing 62 between adjacent perforations 60. FIG. 2 shows a multiplicity of the layered magnetic wafer seals 10 of FIG. 1 removably adhesively affixed to liner 8. FIGS. 3–5 show alternate embodiments of the layered magnetic wafer seal 110–310 removably adhesively affixed to liner 8, where the magnets 120–320 have differing shapes. The layered magnetic wafer seal 10 may be adhesively attached to a piece 1 by applying the second adhesive layer 72 side to the piece 1. FIGS. 24 and 25 show the layered magnetic wafer seal 10 of FIG. 1 attached to a folded piece 1.

As shown in FIG. 1, the magnet 20 of the preferred embodiment of the layered magnetic wafer seal 10 is circular in shape with a preferential diameter, for example, in the range of approximately 1.905 centimeters (0.75 inch) to 2.858 centimeters (1.125 inches), and the magnet 20 has a preferential thickness 22 in the range of approximately 0.305 millimeters (0.012 inch; 12 mils) to 0.381 millimeters (0.015 inch; 15 mils) for example. This thickness 22 allows the layered magnetic wafer seal 10 to be flexibly attached to a piece 1 and to be easily torn along at least one line of weakness 50, 52. Layered magnetic wafer seals having other size, shape or thickness can be used, such as in the layered magnetic wafer seals 10, 110, 210, 310, 410, 510, 610, 710, 810, 910, and 1010 described herein, so long as there is sufficient magnetic strength to secure or hold a piece 1 against a horizontal metallic surface. The magnet 20–1020 shown in the various embodiments herein is preferably die cut or stamped from a known thin sheet of flexible magnetic material, such as a vinyl material having magnetic material dispersed therethrough. Such a sheet of flexible magnetic material can be obtained under the trademark "UltraMag" from Flex-Mag Industrial, Inc., of Marietta, Ohio. Depending on the magnetic capabilities of the magnetic material and the weight of the item to be magnetically affixed, the magnet 20-1020 size and thickness 22-622 can be varied. For example, the magnet 20-1020 diameter or width could vary in size from 2.223 centimeters (0.875 inches) to 7.620 centimeters (3.0 inches) or larger as necessary for use with heavier pieces 1. Additionally, the layered magnetic wafer seal 10–1010 can be made in any number of geometric shapes such as those shown in FIGS. 1–6 and 15, where the magnet 20–320, 1020 has shapes which may include circles, squares, rectangles, rectangles with curved edges, ovals, elliptical shapes, hourglass shapes and figure eight shapes.

Figure 6:
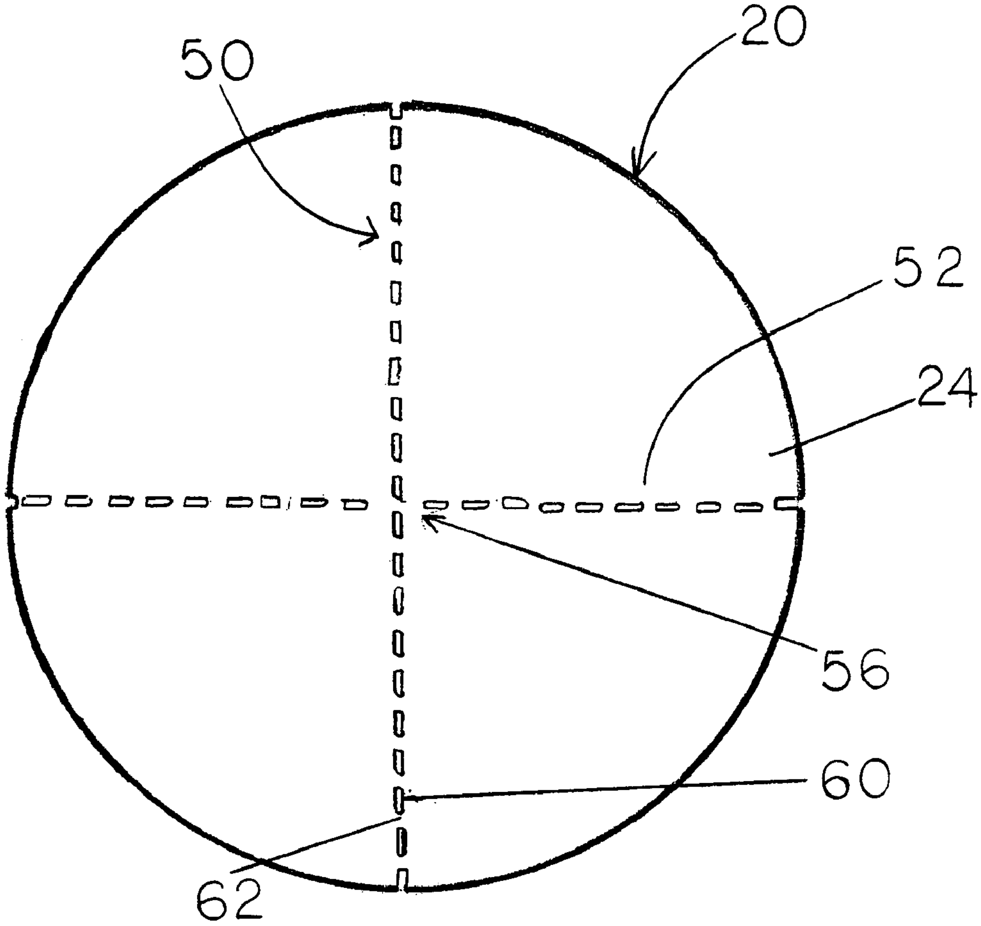
FIG. 6 is a top view of the magnet of the layered magnetic wafer seal of FIG. 1.

As clearly shown in FIGS. 1, 2 and 6, the magnet 20 and paper layer 80 of the preferred embodiment have two lines of weakness 50, 52 extending therethrough. The two lines of weakness 50, 52 intersect at their respective mid-points 56, forming four approximately 90 degree angles therebetween. Each line of weakness 50, 52 is comprised of a multiplicity of spaced perforations 60 which extend through the magnet thickness 22 and paper layer 80. However, in an alternate embodiment, the multiplicity of spaced perforations 60 comprising the two lines of weakness 50, 52 may instead only extend completely through the magnet thickness 22 but not extend through the paper layer 180 (FIG. 7), or the two lines of weakness 50, 52 may instead only extend completely through the paper layer 80 but not extend through the magnet thickness 122 (not shown). Additionally, in a further alternate embodiment, the multiplicity of spaced perforations 60 may instead only extend partially from the upper surface 24 through the magnet thickness 222 toward the lower surface 26 and not extend through the paper layer 180 (FIG. 8).

As shown in FIGS. 1, 2 and 6, the two lines of weakness 50, 52 preferably extend substantially across the center of the magnet 20 and intersect at their respective mid-points 56, forming four approximately 90 degree angles therebetween and dividing the magnet 20 into substantially equally sized quarter sections. However, the two lines of weakness 50, 52 may be in any orientation in regard to the edge of the liner 8, which is removably attached to the adhesive layer during production of the layered magnetic wafer seal 10. The two lines of weakness 50, 52 may also be in any position on the magnet 20 and paper layer 80 or on just the magnet 20 or on just the paper layer 180, and may intersect at any angle in order accommodate the configuration of the tabbing machine to be used.

As shown in FIGS. 1, 2 and 6, the two lines of weakness 50, 52 in the preferred embodiment are comprised of a multiplicity of spaced perforations 60, which extend from the upper surface 24 through the magnet thickness 22 and paper layer 80. The perforations 60 closest to the edges of magnet 20 in lines of weakness 50, 52 preferably cut the magnet 20 along thickness 22. This makes the layered magnetic wafer seal 10 easier to separate along lines of weakness 50, 52. FIG. 6 depicts a top view of the magnet 20 of FIG. 1, showing two lines of spaced perforations 60 extending across the magnet 20. In the preferred embodiment, the multiplicity of perforations 60 comprising lines of weakness 50, 52 each have a spacing 62 between adjacent perforations 60. The spacing 62 may be of any length which allows a consumer to easily tear the layered magnetic wafer seal 10 along the at least one line of weakness 50, 52. The spacing 62 preferably has a length in the approximate range of 0.106 centimeter (0.0417 inch) to 0.159 centimeter (0.0626 inch). When the layered magnetic wafer seal 10 is folded along one of the lines of weakness 50, 52, as shown in FIGS. 24 and 25, that line of weakness 50, 52 along the fold decreases the tendency for the layered magnetic wafer seal 10 to unfold because it decreases the ability of the magnet 20 to resume a flat position.

Figure 7:
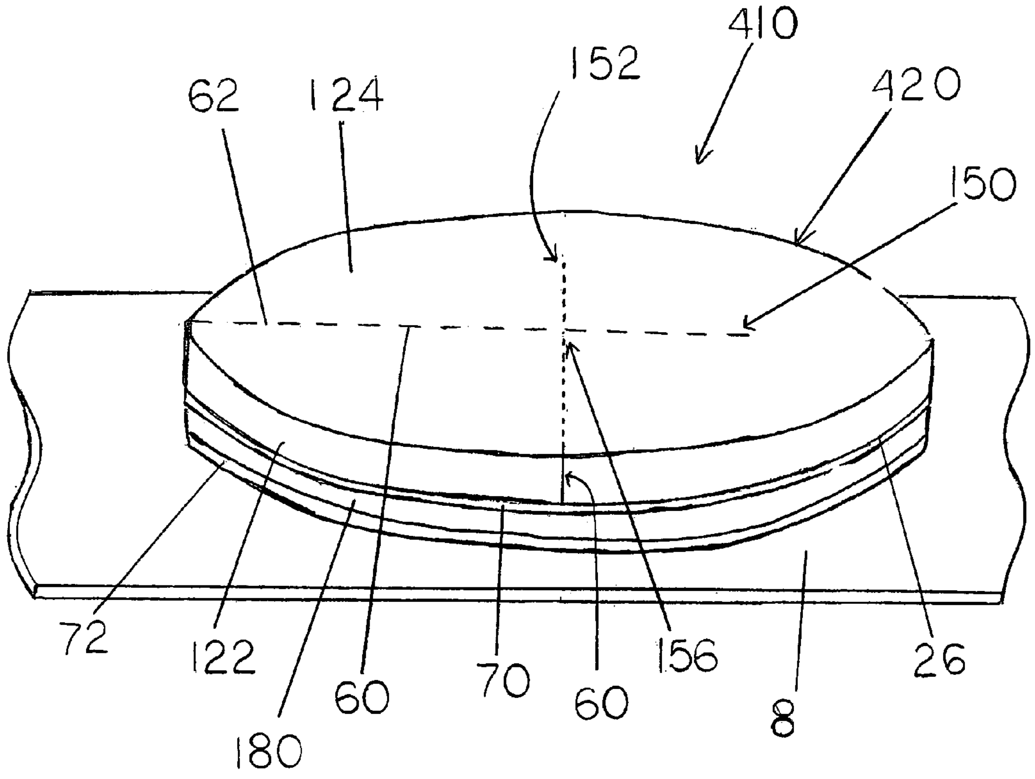
FIG. 7 is a top perspective view of an alternate embodiment of the layered magnetic wafer seal of FIG. 1, where the two lines of weakness extend partially across the magnet and extend completely through the magnet but not the paper layer.
Figure 8:
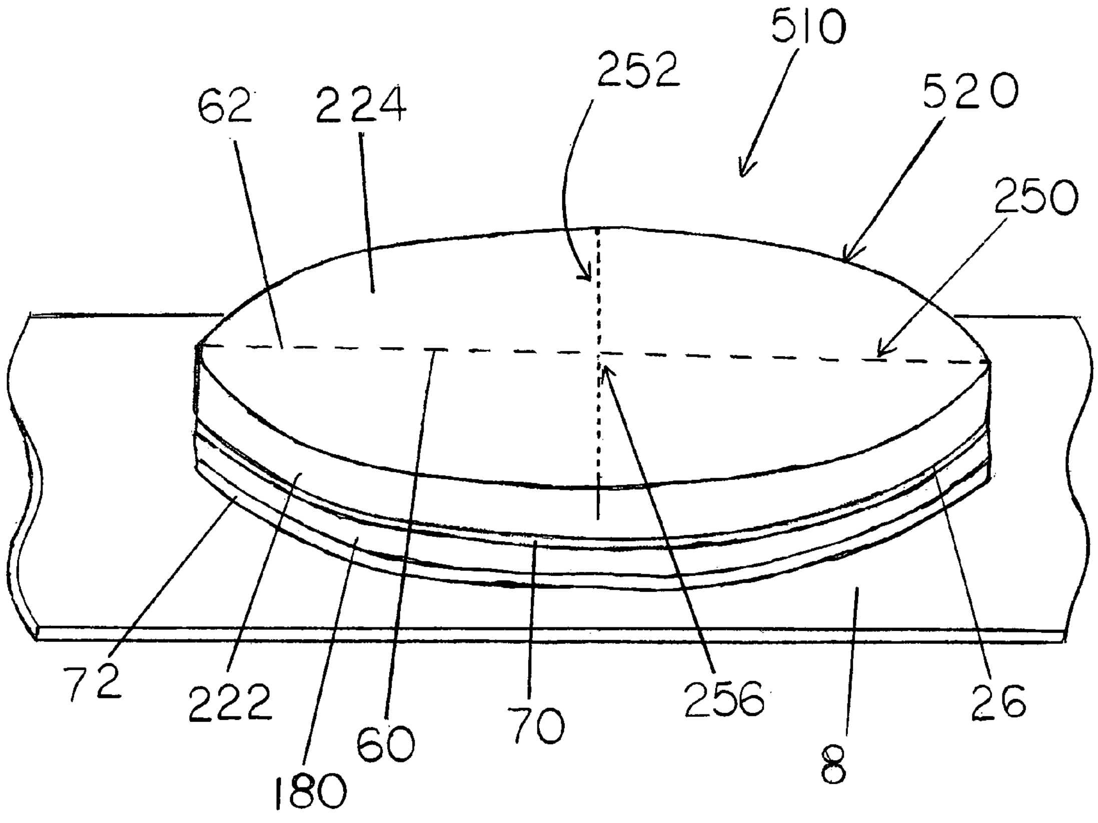
FIG. 8 is a top perspective view of an alternate embodiment of the layered magnetic wafer seal of FIG. 1, where the two lines of weakness extend across the magnet and extend partially through the magnet but not the paper layer.

FIG. 7 depicts an alternate embodiment of the layered magnetic wafer seal 410, in which the layered magnetic wafer seal 410 is composed of a thin, relatively flat, flexible magnet 420 having an upper surface 124, a lower surface 26, a thickness 122 between said upper surface 124 and said lower surface 26, two lines of weakness 150, 152 comprised of a multiplicity of spaced perforations 60 extending partially across the magnet upper surface 124 and extending completely through the magnet 420, a first adhesive layer 70 affixed to the lower surface 26, a paper layer 180 having the same shape as the magnet 20 affixed to the first adhesive layer 70, and a second adhesive layer 72 affixed to the paper layer 180. In this embodiment, the at least one line of weakness comprises two intersecting lines of weakness 150, 152 which extend through the magnet thickness 122 to the magnet lower surface 26, but do not extend into the paper layer 180. The two lines of weakness 150, 152 intersect at their respective mid-points 156 and form four approximately 90 degree angles therebetween. Each of the two lines of weakness 150, 152 are comprised of a multiplicity of spaced perforations 60 which extend through the magnet thickness 122 and each of the multiplicity of perforations 60 have a spacing 62 between adjacent perforations 60. The spacing 62 may be of any length which allows a consumer to easily tear the layered magnetic wafer seal 410 along a line of weakness 150, 152. The liner 8 may be detached from the second adhesive layer 72 whereby the layered magnetic wafer seal 410 may be adhesively attached to a piece 1 by applying the second adhesive layer 72 side to the piece 1.

FIG. 8 depicts an alternate embodiment of the layered magnetic wafer seal 510, in which the layered magnetic wafer seal 510 is composed of a thin, relatively flat, flexible magnet 520 having an upper surface 224, a lower surface 26, a thickness 222 between said upper surface 224 and said lower surface 26, two lines of weakness 250, 252 comprised of a multiplicity of spaced perforations 60 extending at least partially across the magnet upper surface 224, a first adhesive layer 70 affixed to the lower surface 26, a paper layer 80 having the same shape as the magnet 20 affixed to the first adhesive layer 70, and a second adhesive layer 72 affixed to the paper layer 80. In this embodiment, the at least one line of weakness comprises two intersecting lines of weakness 250, 252 which extend at least partially through the magnet thickness 222 towards the magnet lower surface 26 but do not extend through the paper layer 180. The two lines of weakness 250, 252 intersect at their respective mid-points 256 and form four approximately 90 degree angles therebetween. Each of the two lines of weakness 250, 252 are comprised of a multiplicity of spaced perforations 60 which extend at least partially through the magnet thickness 222 towards the lower surface 26, and each of the multiplicity of perforations 60 have a spacing 62 between adjacent perforations 60. The spacing 62 may be of any length which allows a consumer to easily tear the layered magnetic wafer seal 510 along a line of weakness 250, 252. In this embodiment, where the perforations 60 do not extend fully through the magnet thickness 22, the perforations 60 are preferably at least 0.127 to 0.229 millimeters (0.005 to 0.009 inch; 5 to 9 mils) deep, when the thickness 22 of magnet 20 is 0.305 millimeters (0.012 inch; 12 mils). After removal from the liner 8, the layered magnetic wafer seal 510 may be adhesively attached to a piece 1 by applying the second adhesive layer 72 side to the piece 1.

Figure 9:
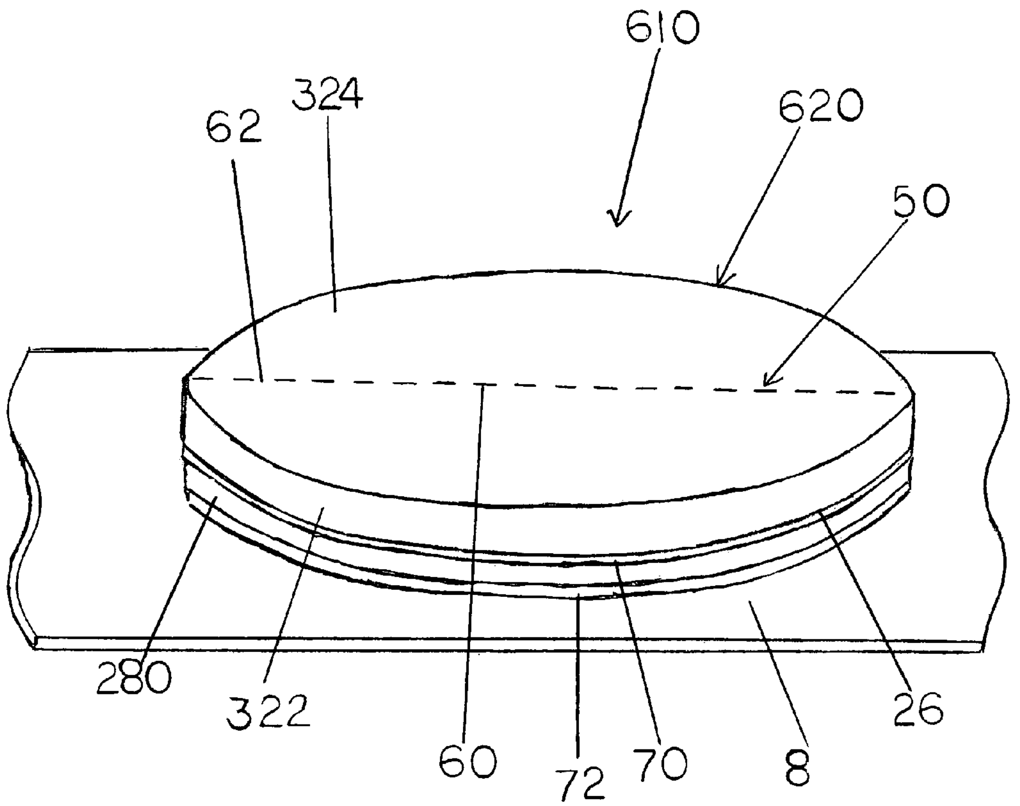
FIG. 9 is a top perspective view of an alternate embodiment of the layered magnetic wafer seal of FIG. 1, having one line of weakness extend across the magnet and extend completely through the magnet but not the paper layer.

FIG. 9 depicts an alternate embodiment of the layered magnetic wafer seal 610, in which the layered magnetic wafer seal 610 is composed of a thin, relatively flat, flexible magnet 620 having an upper surface 324, a lower surface 26, a thickness 322 between said upper surface 324 and said lower surface 26, a first adhesive layer 70 affixed to the lower surface 26, a paper layer 280 having the same shape as the magnet 620 affixed to the first adhesive layer 70, a second adhesive layer 72 affixed to the paper layer 280, and one line of weakness 50 comprised of a multiplicity of spaced perforations 60 extending at least partially across the magnet upper surface 324 and paper layer 280. The one line of weakness 50 is comprised of a multiplicity of spaced perforations 60 which extend both at least partially across the magnet upper surface 324 and the paper layer 280 and extends completely through the magnet thickness 322 and paper layer 280. Each of the multiplicity of perforations 60 have a spacing 62. The spacing 62 may be of any length which allows a consumer to easily tear the layered magnetic wafer seal 610 along the line of weakness 50. After removal from the liner 8, the layered magnetic wafer seal 610 may be adhesively attached to a piece 1 by applying the second adhesive layer 72 side to the piece 1. In an alternate embodiment, the multiplicity of spaced perforations 60 comprising the one line of weakness 50 may instead only extend completely through the magnet thickness 322 but not extend through the paper layer 180. Additionally, in a further alternate embodiment, the multiplicity of spaced perforations 60 comprising the one line of weakness 50 may instead only extend partially from the upper surface 324 through the magnet thickness 322 toward the lower surface 26 and not extend through the paper layer 180.

Figure 10:
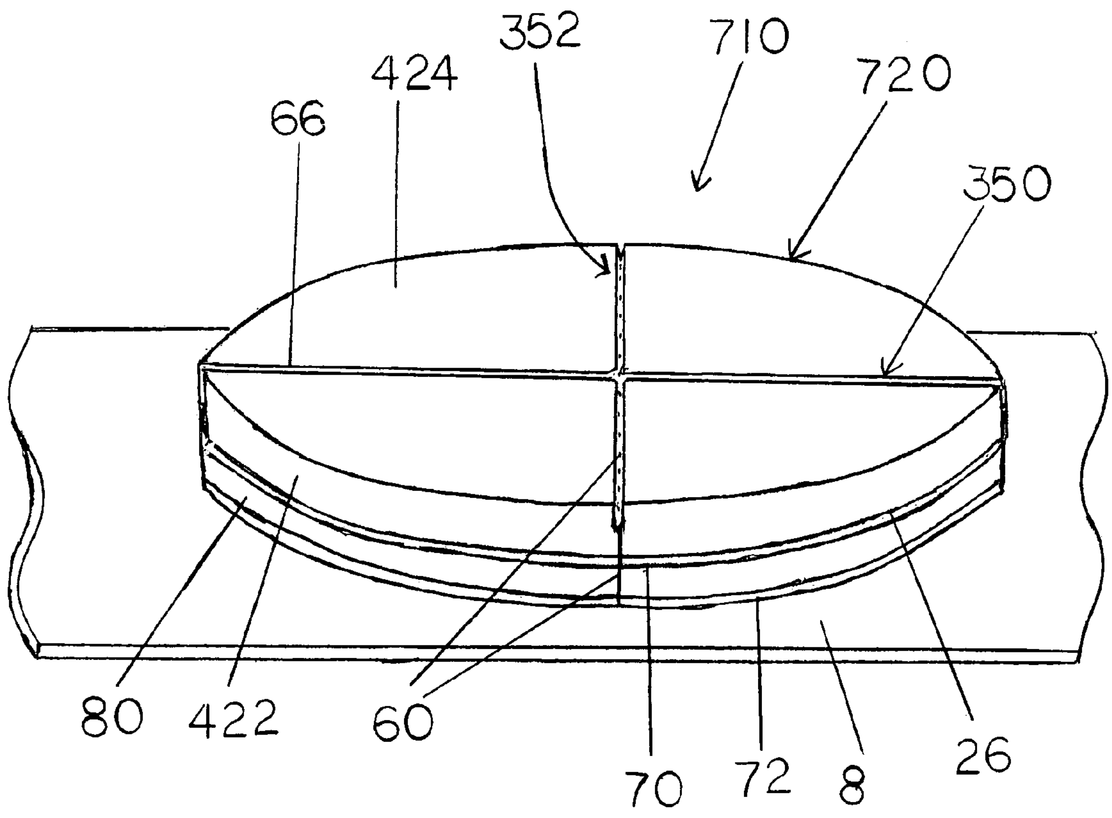
FIG. 10 is a top perspective view of an alternate embodiment of the layered magnetic wafer seal of FIG. 1, having two lines of weakness comprised of two scorelines and a multiplicity of perforations.

FIG. 10 depicts an alternate embodiment of the layered magnetic wafer seal 710, in which the layered magnetic wafer seal 710 is composed of a thin, relatively flat, flexible magnet 720 having an upper surface 424, a lower surface 26, a thickness 422 between said upper surface 424 and said lower surface 26, a first adhesive layer 70 affixed to the lower surface 26, a paper layer 80 having the same shape as the magnet 720 affixed to the first adhesive layer 70, a second adhesive layer 72 affixed to the paper layer 80, and two lines of weakness 350, 352 comprised of two intersection scorelines 66 extending at least partially across the magnet upper surface 424 and at least partially through the magnet thickness 422 and further comprised of a multiplicity of spaced perforations 60 extending at least partially across and completely through the remainder of the thickness 422 and the paper layer 80 under each of the scorelines 66. As shown in FIG. 10, the scoreline 66 does not extend fully through the thickness 422 of the magnet 720. For a magnet 720 having a thickness 422 of about 0.305 millimeters (0.012 inch or 12 mils), the scoreline 66 is preferably 0.0762 millimeters (0.003 inch; 3 mils) to 0.229 millimeters (0.009 inch; 9 mils) deep, and more preferably 0.127 millimeters (0.005 inch; 5 mils) to 0.178 millimeters (0.007 inch; 7 mils) deep. Each of the multiplicity of perforations 60 have a spacing 62 between adjacent perforations 60. The spacing 62 may be of any length which allows a consumer to easily tear the layered magnetic wafer seal 710 along the line of weakness 250. After removal from the liner 8, the layered magnetic wafer seal 710 may be adhesively attached to a piece 1 by applying the second adhesive layer 72 side to the piece 1. However, in an alternate embodiment, the scorelines 166 of the two lines of weakness 350, 352 may extend completely through the magnet thickness 422 and the perforations would extend only through the paper layer 80 under the scorelines 166.

Figure 11:
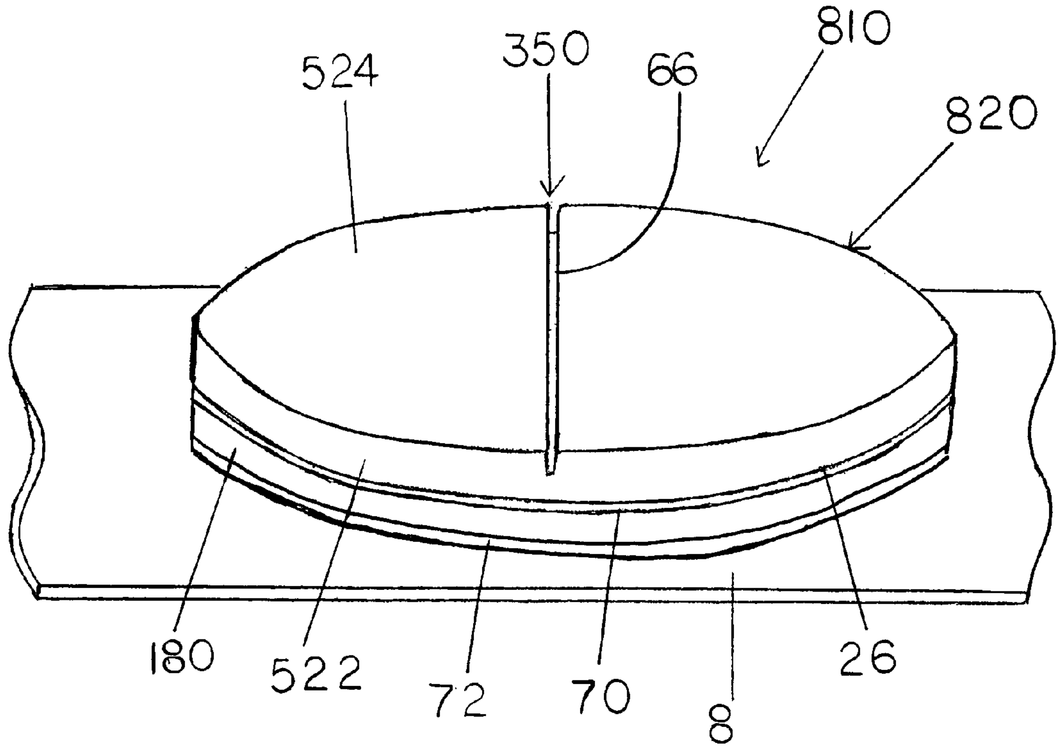
FIG. 11 is a top perspective view of an alternate embodiment of the layered magnetic wafer seal of FIG. 1, having a scoreline.

FIG. 11 is a top perspective view of an alternate embodiment of the layered magnetic wafer seal 810 of the present invention, comprising a thin, relatively flat, flexible magnet 820 having an upper surface 524, a lower surface 26, a thickness 522 between said upper surface 524 and said lower surface 26, one line of weakness comprised of a scoreline 66 which extends at least partially across the magnet upper surface 524 and extends at least partially through the magnet thickness 522 towards the lower surface 26, a first adhesive layer 70 affixed to the lower surface 26, and a second adhesive layer 72 affixed to the paper layer 180. As shown in FIG. 11, the one line of weakness 350 is comprised of a scoreline 66, which is a cut line that does not extend fully through the thickness 522 of the magnet 820. For a magnet 820 having a thickness 522 of about 0.305 millimeters (0.012 inch or 12 mils), the scoreline 66 is preferably 0.0762 millimeters (0.003 inch; 3 mils) to 0.229 millimeters (0.009 inch; 9 mils) deep, and more preferably 0.127 millimeters (0.005 inch; 5 mils) to 0.178 millimeters (0.007 inch; 7 mils) deep.

Figure 12:
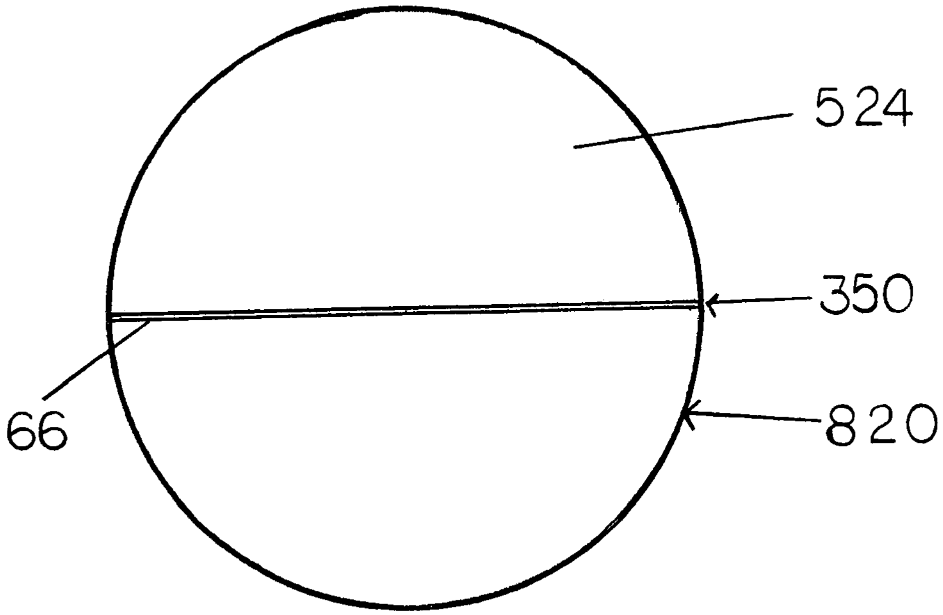
FIG. 12 is a top view of the magnet of FIG. 11.
Figure 13:
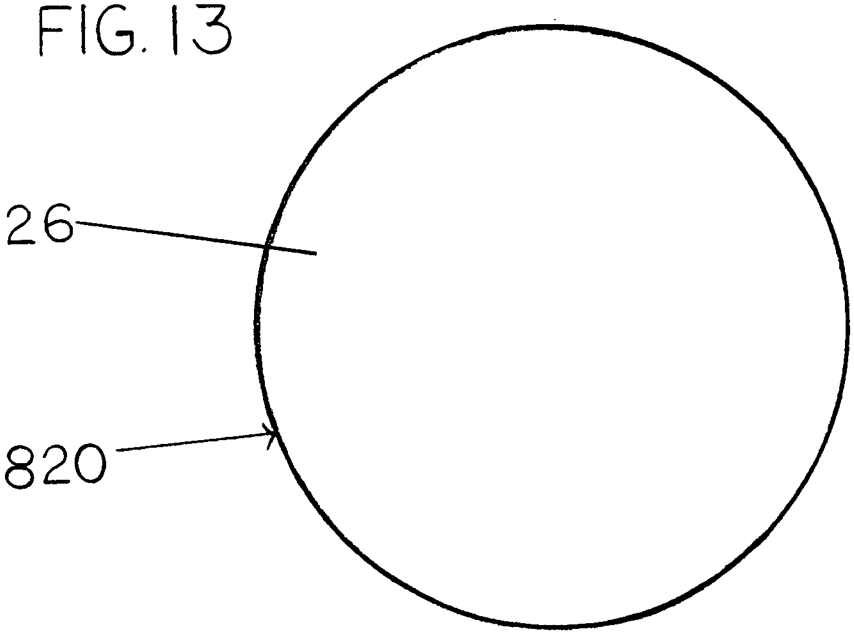
FIG. 13 is a bottom view of the magnet of FIG. 11.

FIG. 12 depicts a top view of the magnet 820 of FIG. 11, with the magnet 820 having a scoreline 66 extending fully across its upper surface 524. FIG. 13 depicts the lower surface 26 of the magnet 820 of FIG. 11, showing that the scoreline 66 does not extend entirely through the magnet thickness 822 and does not extend through the lower surface 26. Alternatively, an alternate embodiment may have one line of weakness which comprises two intersecting scorelines 66 which extend at least partially through the magnet thickness 522 towards the magnet lower surface 26 (not shown). The two scorelines 66 intersect at their respective mid-points and form four approximately 90 degree angles therebetween (not shown).

Figure 14:
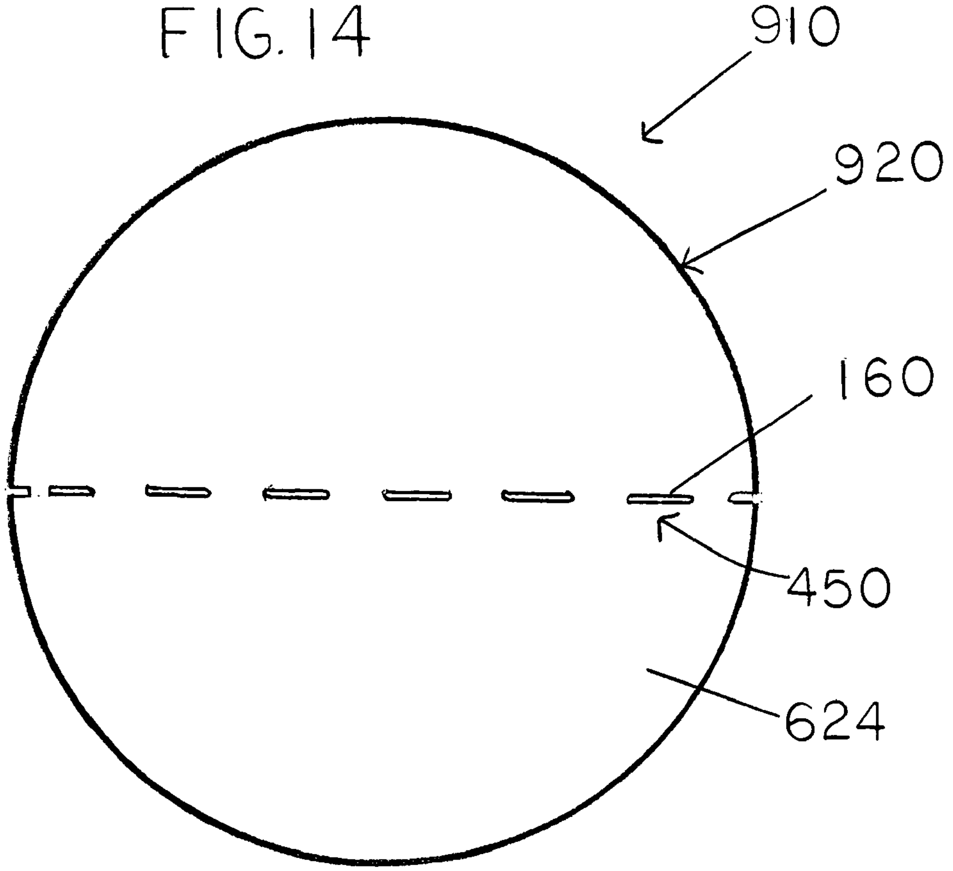
FIG. 14 is a top view of an alternate embodiment of the layered magnetic wafer seal of FIG. 1 having a line of weakness composed of one or more slits.

FIG. 14 depicts an alternate embodiment of the magnet 920 of the layered magnetic wafer seal 910 of FIG. 11, where one line of weakness 450 is comprised of one or more slits 160 which extend at partially across the magnet 920 upper surface 624 and which extend at least partially or completely through the magnet thickness 622 (not shown). Alternatively, the layered magnetic wafer seal 910 may have two intersecting lines 450, 452 consisting of one or more slits which extend at least partially or completely through the magnet thickness 622. The two lines 450, 452 intersect at their respective mid-points 456 and form four approximately 90 degree angles therebetween (not shown).

Figure 15:
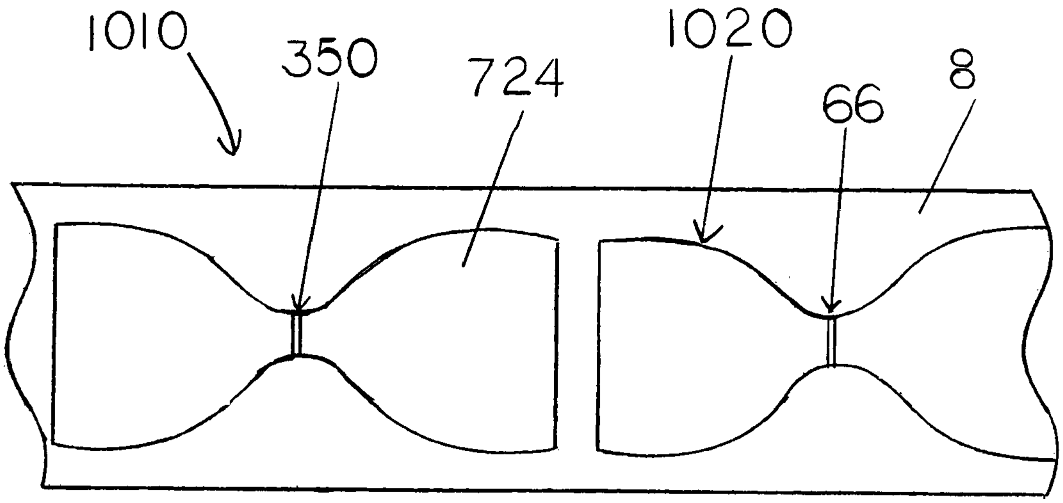
FIG. 15 is a top view of a multiplicity of an alternate embodiment of the layered magnetic wafer seal of FIG. 1, having a different shape.

FIG. 15 depicts an alternate embodiment of the layered magnetic wafer seal 1010 of FIGS. 10–12, where the magnet 1020 has an hour-glass shape. The at least one line of weakness 350 comprises score-line 66 extending across the narrowest area of the upper surface 724, as depicted in FIG. 15, but the one line of weakness 350 may also be comprised of spaced perforations 60 or slits 160 extending substantially across the narrowest area of the upper surface 724.

Additionally, as shown in the figures, all embodiments of the layered magnetic wafer seal 10–1010 can be made in any number of geometric shapes such as those shown in FIGS. 1–6 and 15, where the magnet 20–320, 1020 has shapes which may include circles, squares, rectangles, rectangles with curved edges, ovals, elliptical shapes, hourglass shapes and figure eight shapes.

Magnet 1020 shapes such as the hourglass shape depicted in FIG. 15 allow the size of the layered magnetic wafer seal 1010 which is adhesively affixed to the piece 1 to be maximized, while the length of that portion of the magnet 1020 to be torn by the consumer is minimized. For example, the narrow area of the magnet 1020 which is to be torn by the consumer could be sized to be only 0.635 centimeter (0.250 inch) to 1.27 centimeters (0.500 inch) wide.

In each of the embodiments of the layered magnetic wafer seal 10–1010 of FIGS. 1–15, and as shown in FIGS. 1 and 8–11, a first layer of adhesive 70 is affixed to the lower surface 26 of the magnet 20–1020 and a second layer of adhesive 72 is affixed to the paper layer 80–280. The adhesive layers 70, 72 are preferably about 0.0762 millimeters (0.003 inch; 3 mils) thick, although they may be thinner or thicker as required by the application. The adhesive is preferably a permanent adhesive with a minimum adhesive or shear strength value of at least 425.25 grams (15 ounces) per 2.54 centimeters (1 inch) at a speed of 30.48 centimeters (12 inches) per minute after application to a stainless steel plate; however any suitable adhesive may be used. The paper layer 80–280 provides strength to the line of weakness 50–450, 52–452 and assists in maintaining the integrity of the magnetic wafer seal 10–1010 when folded and prior to the consumer intentionally breaking at least one line of weakness 50–450, 52–452. The paper layer 80–280 may be comprised of an uncoated paper substrate, vinyl or plastic, whether the paper layer 80–280 contain perforations 66 or slits 166. The uncoated paper substrate is weaker and easier to tear than the vinyl or plastic, so use of the uncoated paper substrate is preferred when the paper layer 180 contains no perforations 66 or slits 166. The second adhesive layer 72 is attached to and covered by a removable liner 8. The liner 8 is preferably comprised of paper, plastic or vinyl, although it may be made of any suitable material.

One method for forming the layered magnetic wafer seal 10–11010 of all embodiments of the present invention (FIGS. 1–15), including the preferred embodiment of the magnetic wafer 10 of FIG. 1, is as follows: a second layer 72 of the adhesive material is affixed to a liner 8. A paper layer 80–280 is applied over the liner 8 onto the second adhesive layer 72. A first layer 70 of the adhesive material is applied over and to the paper layer 80–280. A layer of magnetic material is then applied over and onto the first adhesive layer 70. The layers of adhesive, paper and magnetic material are then die cut into a chosen shape to the depth of, but not through, the liner 8, cutting one or more layered magnetic wafer seal 10–1010 into the magnetic material, and the extra magnetic material and paper is detached from the liner 8, leaving the one or more layered magnetic wafer seals 10–1010 removably adhesively attached to the liner 8. The at least one line of weakness 50–450, 52–452 is added during the die cutting process. The perforations 66 are added to the magnet by perforation needles and may be added to the magnet or paper layer as required by the embodiment by insertion of the needles through the magnet upper surface and partially piercing the magnet thickness, or by insertion of the needles into the magnet upper surface and completely piercing the magnet thickness. The needles may then be inserted further through the layered magnetic wafer seal in order to pierce the paper layer. Additionally, the needles may be first inserted through the liner and then paper layer, leaving the magnet unperforated, or the needles may be inserted through first the liner, then the paper layer and then partially or completely through the magnet thickness. The spacings 62 are formed by the spacings between the perforation needles used to create the at least one line of weakness 50–250, 52–252. The scoreline 66 is also formed by a blade during the die cutting process. The perforations 60 closest to the edges of magnet 20–1020 in lines of weakness 50–250, 52–252 preferably cut the magnet 20–1020 along thickness 22–422. This makes the layered magnetic wafer seal 10–1010 easier to separate along lines of weakness 50–250, 52–252.

The at least one line of weakness 50–450, 52–452 on the layered magnetic wafer seal 10–1010 of the layered magnetic wafer seal 10–1010 may be oriented in relation to the liner 8 in any orientation which is required by the tabbing machine being used (see FIGS. 1–5 and 8–11). Where two lines of weakness 50, 52 are employed (FIGS. 1–5, 7, 8), one line of weakness 50–450 can be aligned parallel to the edges of the liner 8 and the other line of weakness 52–452 can be aligned perpendicular to the edges of the liner 8. Where one line of weakness 50–450 is employed as in FIGS. 9 and 11, the line of weakness 50–450 can be aligned either parallel to the edges of the liner 8 (FIGS. 9 and 10) or perpendicular to the edges of the liner 8 (FIG. 11). Additionally, any other orientation of the at least one line of weakness 50–450, 52–452 required by the tabbing process may be employed. The layered magnetic wafer seal 10 of the preferred embodiment and all of the alternate embodiments of the layered magnetic wafer seal 10–1010 of the present invention (FIGS. 1–14), with the exception of the embodiment 1010 of FIG. 15 which has an hourglass shape, may be utilized with existing tabbing machines by reconfiguring the tabbing machine to accept and apply the label. For those layered magnetic wafer seals 10–1010 employed on pieces 1 to be mailed, the layered magnetic wafer seal 10–1010, including the magnet 20–1020, the first adhesive layer 70 and the second adhesive layer 72, must have sufficient strength and holding power to hold the piece 1 sealed in a unitary folded piece 1 without the piece 1 losing form or unsealing during the mail processing by the United States Postal Service. In each of the embodiments, the layered magnetic wafer seal 10–1010 may be adhesively affixed to a piece 1 by removing the layered magnetic wafer seal 10–1010 from the liner 8, then applying the second adhesive layer 72 side of a portion of the layered magnetic wafer seal 10–1010 to two outer open edges 3 of the piece 1 so that the layered magnetic wafer seal 10–1010 is folded over and adhered to the outer surface 5 of the piece 1, thereby holding the piece edges 3 together and sealing them. As depicted in FIGS. 24 and 25, the at least one line of weakness 50–450, 52–452 in the layered magnetic wafer seal 10–1010 serves as a fold line and allow the layered magnetic wafer seal 10–1010 to be easily folded along any of the at least one lines of weakness 50–450, 52–452, wherein the portions of the upper surface 24–624 on either side of the folded line of weakness 50–450, 52–452 are pressed towards each other, bringing portions of the lower surface 26 in proximity to each other.

Figure 16:
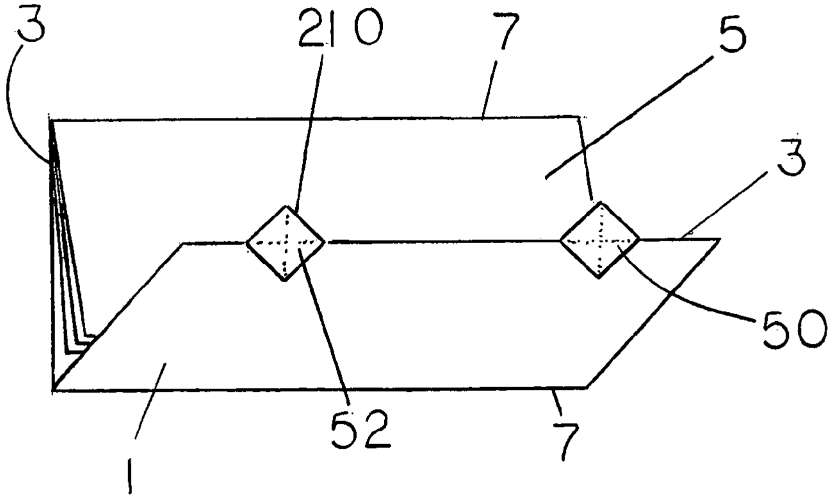
FIG. 16 is a front perspective view of a multi-page piece prior to sealing, folded into three sections and having two layered magnetic wafer seals of FIG. 4 affixed to an outside end edge.
Figure 17:
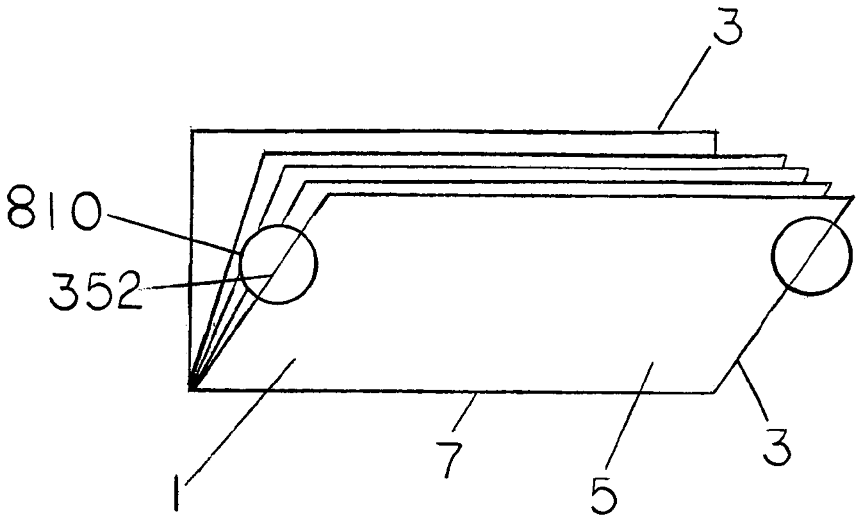
FIG. 17 is a front perspective view of a multi-page piece prior to sealing, folded into two sections and having two layered magnetic wafer seals of FIG. 1 each affixed to an outside side edge.
Figure 18:
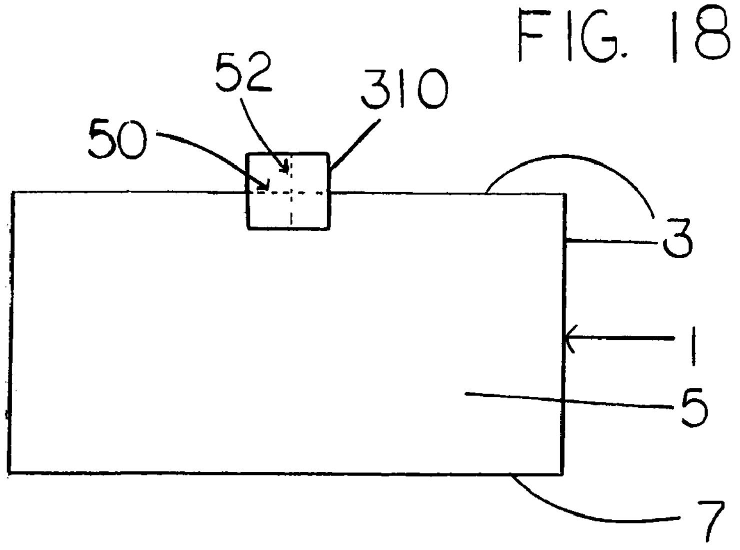
FIG. 18 is a front view of a piece prior to sealing, folded into two sections and having one layered magnetic wafer seal of FIG. 5 affixed to an outside end edge.
Figure 19:
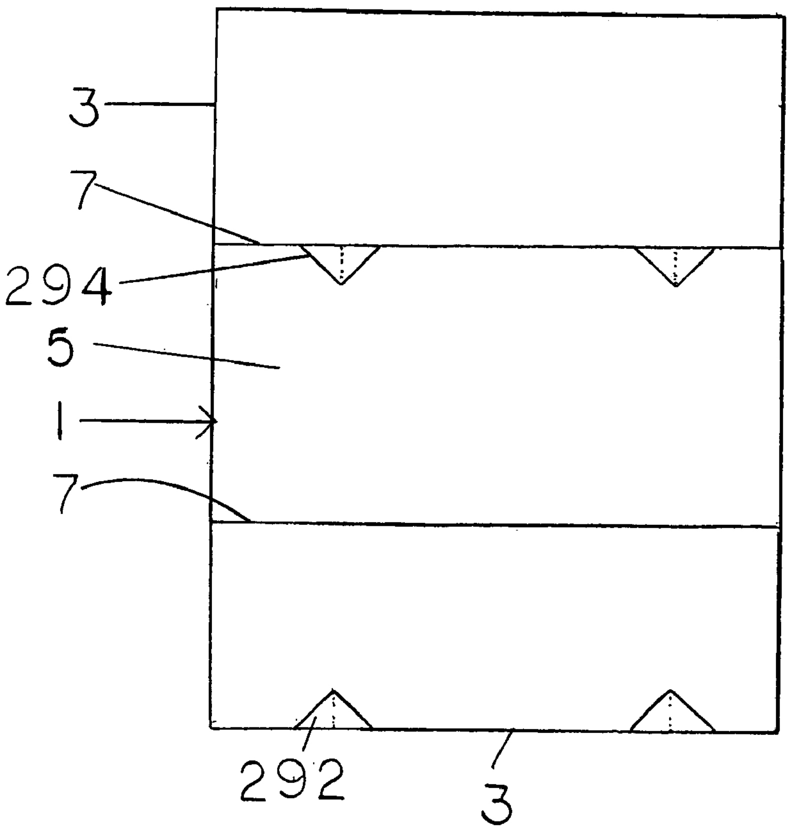
FIG. 19 is a front view of the piece of FIG. 16, where the piece is unsealed and unfolded and has four magnetic holders.
Figure 20:
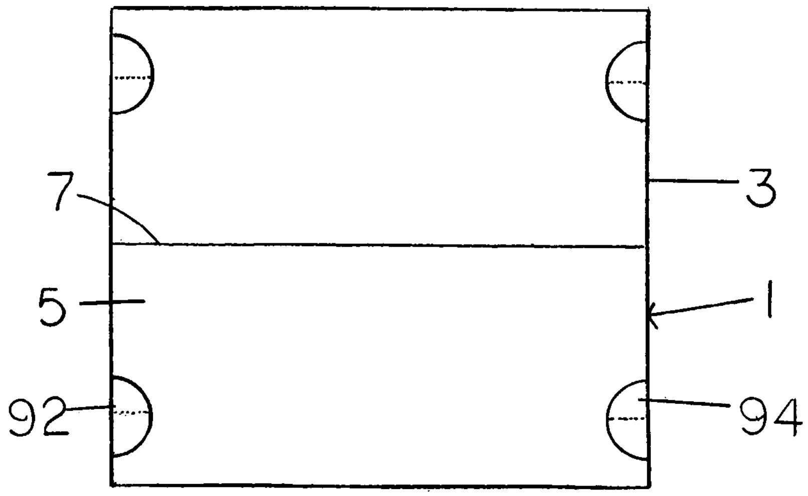
FIG. 20 is a front view of the piece of FIG. 17, where the piece is unsealed and unfolded and has four magnetic holders.
Figure 21:
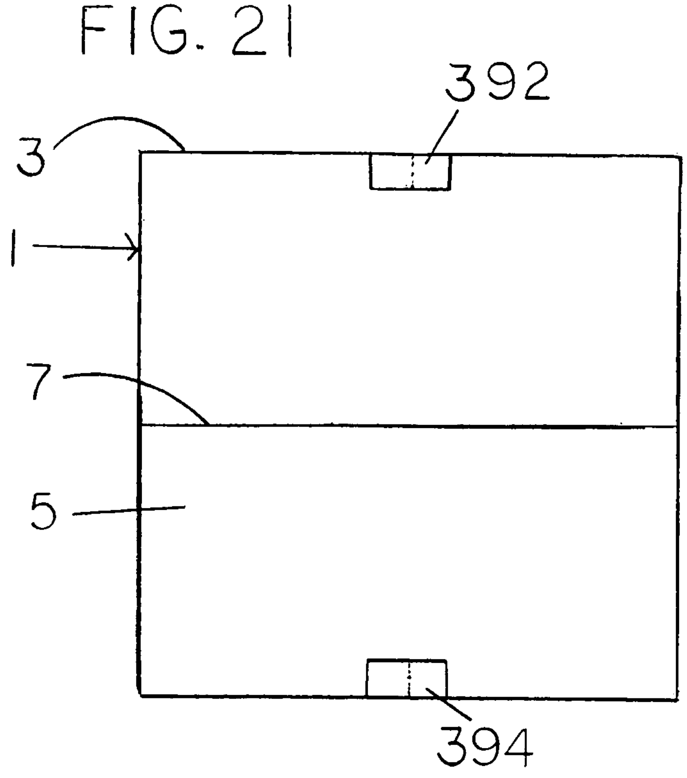
FIG. 21 is a front view of the piece of FIG. 18, where the piece is unsealed and unfolded and has two magnetic holders.
Figure 22:
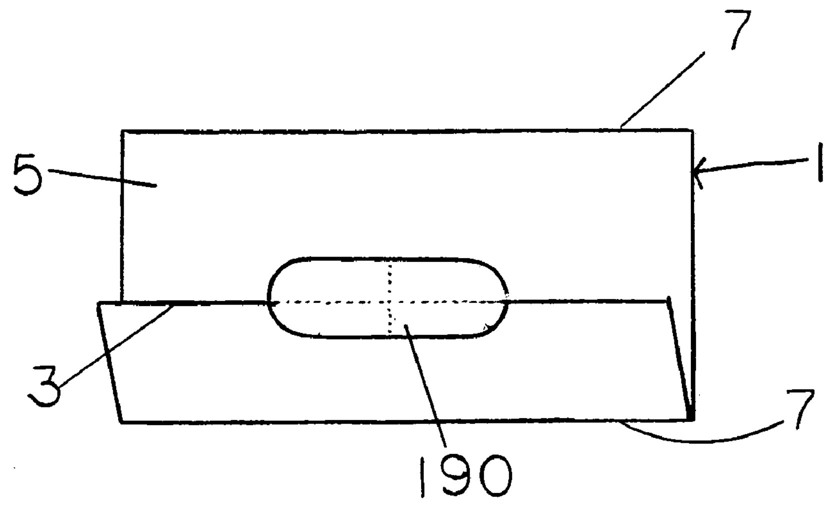
FIG. 22 is a front perspective view of a piece prior to sealing, folded into three sections and having one layered magnetic wafer seal of FIG. 3 affixed to an outside end edge.
Figure 23:
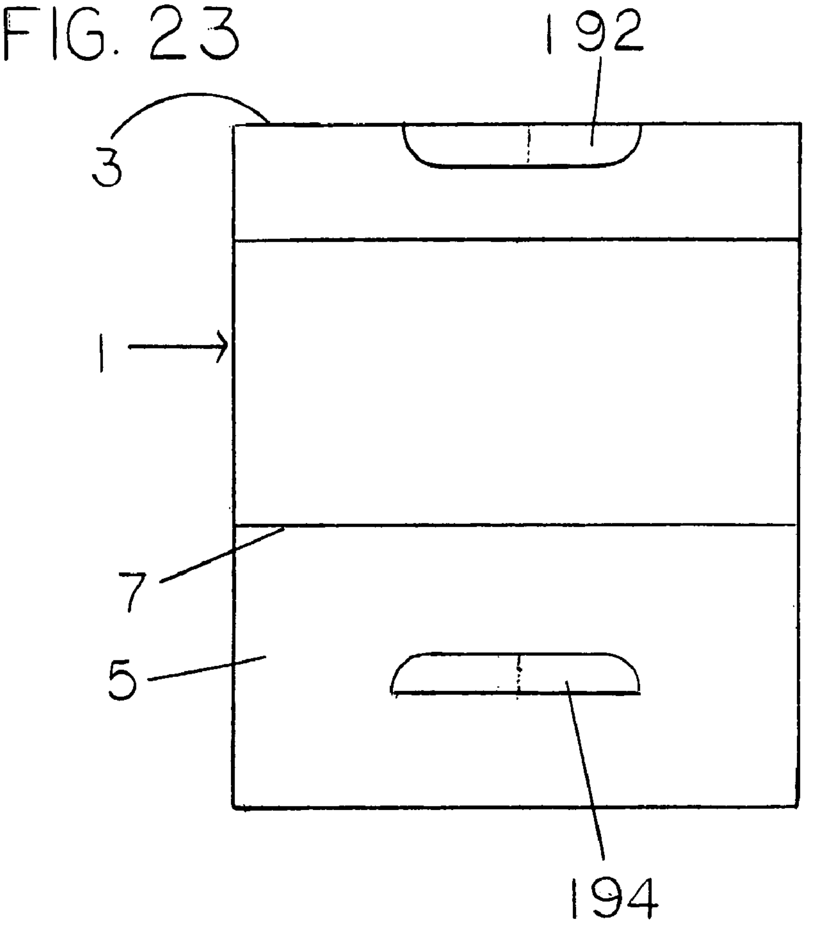
FIG. 23 is a front view of the piece of FIG. 22, where the piece is unsealed and unfolded and has two magnetic holders.

FIGS. 17–18 show a one or more of the layered magnetic wafer seals 810, 310 partially adhesively affixed to one or more outer edges 3 of a piece 1, prior to sealing the piece 1 by folding the piece 1 along the a fold line 7 and folding the layered magnetic wafer seal 10–1010 along one of the at least one line of weakness 50–450, 52–452 and adhesively attaching another portion of the layered magnetic wafer seal 10–1010 to a second outer edge 3. Folding the layered magnetic wafer seal 10–1010 along the at least one line of weakness 50–450, 52–452 also permits the layered magnetic wafer seal 10–1010 to stay in the folded position. Additionally, as shown in FIGS. 16 and 22, the layered magnetic wafer seal 10–1010 may be adhesively attached to an outer edge 3 and an outer surface 5 of the piece 1 in order to seal the piece 1. The process of sealing the piece 1 by application of the layered magnetic wafer seal 10–1010 may be used for any of the embodiments of FIGS. 1–15.

The consumer unseals the piece 1 by tearing or breaking the layered magnetic wafer seal 10–1010 of any of the embodiments of the present invention along the line or lines of weakness 50–450, 52–452 and then unfolding the folds 7 of the piece 1. As shown in FIGS. 19–21 and 23, this action converts the layered magnetic wafer seal 10–1010 into at least two magnetic holders 92–392, 94–394 for securing a piece 1 to a metallic surface. The unfolded piece 1 can then be secured to a metallic surface by placing the outer surface 5 of the piece 1 containing the magnetic holders 92–392, 94–394 against the metallic surface, thereby allowing the magnetic holders 92–392, 94–394 to engage the metallic surface, holding the piece 1 in place.

A plurality of layered magnetic wafer seals 10–1010 could be employed to seal the piece 1. For example, two or more layered magnetic wafer seals 10–1010 could be placed along the end edge 3 of the piece 1 (FIG. 16), one or more could be placed along the open side edge 3 or edges 3 of the piece 1 (FIG. 17) or one or more could be used to seal an edge 3 of the substrate against a surface 5 of the substrate (FIGS. 16 and 22).

The foregoing detailed description is given primarily for clearness of understanding and no unnecessary limitations are to be understood therefrom, for modifications can be made by those skilled in the art upon reading this disclosure and may be made without departing from the spirit of the invention.

What is claimed is:

1. A layered magnetic wafer seal comprising:

a. a flexible magnet, said magnet having an upper surface, a lower surface, a thickness between said upper surface and said lower surface, a line of weakness extending at least partially across said upper surface, and a shape;

b. a first adhesive layer affixed to said lower surface;

c. a paper layer affixed to said first adhesive layer; and d. a second adhesive layer affixed to said paper layer;

e. where said line of weakness extends at least partially through said thickness towards said lower surface, said flexible magnet being foldable along said line of weakness.

2. The layered magnetic wafer seal as recited in claim 1, where said line of weakness extends substantially across said upper surface.

3. The layered magnetic wafer seal as recited in claim 1, where said line of weakness is comprised of a multiplicity of perforations, and where said multiplicity of perforations are separated by a spacing between adjacent perforations of said multiplicity of perforations.

4. The layered magnetic wafer seal as recited in claim 3, where said line of weakness extends fully through said thickness to said lower surface.

5. The layered magnetic wafer seal as recited in claim 4, where said line of weakness extends through said paper layer.

6. The layered magnetic wafer seal as recited in claim 1 where said line of weakness comprises a scoreline.

7. The layered magnetic wafer seal as recited in claim 1, further comprising a line of perforations in said paper layer, where adjacent perforations in said line of perforations are separated by a spacing.

8. The layered magnetic wafer seal as recited in claim 1 where said line of weakness comprises a multiplicity of adjacent slits, where each of said multiplicity of adjacent slits is separated by a spacing.

9. The layered magnetic wafer seal as recited in claim 1, further comprising a first portion and a second portion, said first portion and said second portion separated by said line of weakness therebetween, and where said layered magnetic wafer seal will hold two sides of a folded piece together when said first portion is adhesively attached by said second adhesive layer to a first outer surface of the folded piece, said layered magnetic wafer seal is folded along said line of weakness, and said second portion is adhesively attached by said second adhesive layer to a second outer surface of the folded piece.

10. The layered magnetic wafer seal as recited in claim 1, where when said layered magnetic wafer seal is broken along said line of weakness, thereby separating said first portion and said second portion, said layered magnetic wafer seal forms at least two magnetic holders.

11. A layered magnetic wafer seal comprising:

a. a flexible magnet, said magnet having an upper surface, a lower surface, a thickness between said upper surface and said lower surface, two intersecting lines of weakness extending at least partially across said upper surface, and a shape;

b. a first adhesive layer affixed to said lower surface;

c. a paper layer affixed to said first adhesive layer; and d. a second adhesive layer affixed to said paper layer;

e. where said two lines of weakness extend at least partially through said thickness towards said lower surface, said flexible magnet being foldable along either of said two lines of weakness.

12. The layered magnetic wafer seal as recited in claim 11, where said two lines of weakness extend substantially across said upper surface.

13. The layered magnetic wafer seal as recited in claim 11, where said two lines of weakness are comprised of a multiplicity of perforations, and where said multiplicity of perforations are separated by a spacing between adjacent perforations of said multiplicity of perforations.

14. The layered magnetic wafer seal as recited in claim 13, where said two lines of weakness extend fully through said thickness to said lower surface.

15. The layered magnetic wafer seal as recited in claim 14, where said two lines of weakness extend through said paper layer.

16. The layered magnetic wafer seal as recited in claim 11 where said two lines of weakness each comprise a scoreline.

17. The layered magnetic wafer seal as recited in claim 11, further comprising a line of perforations in said paper layer, where adjacent perforations in said line of perforations are separated by a spacing.

18. The layered magnetic wafer seal as recited in claim 11 where said two lines of weakness comprise a multiplicity of adjacent slits, where each of said multiplicity of adjacent slits is separated by a spacing.

19. The layered magnetic wafer seal as recited in claim 11, further comprising a first portion and a second portion, said first portion and said second portion separated by either of said two lines of weakness therebetween, and where said layered magnetic wafer seal will hold two sides of a folded piece together when said first portion is adhesively attached by second adhesive layer to a first outer surface of the folded piece, said layered magnetic wafer seal is folded along either of said two lines of weakness, and said second portion is adhesively attached by second adhesive layer to a second outer surface of the folded piece.

20. The layered magnetic wafer seal as recited in claim 11, where when said layered magnetic wafer seal is broken along either of said two lines of weakness, thereby separating said first portion and said second portion, said layered magnetic wafer seal forms at least two magnetic holders.

* * * * *